United States Patent

Grenier et al.

Patent Number: 5,397,204
Date of Patent: Mar. 14, 1995

[54] TOOL FOR ENGRAVING MACHINES

[75] Inventors: Gilbert Grenier, Annonay; Jean Noir, Anneyron; Jean Parjat, Epinouze, all of France

[73] Assignee: Sandvik Hard Materials S.A., Epinouze, France

[21] Appl. No.: 117,754

[22] Filed: Sep. 8, 1993

[30] Foreign Application Priority Data

Sep. 8, 1992 [FR] France .................. 92 10691

[51] Int. Cl.⁶ .................. B23C 5/26; B23B 27/16
[52] U.S. Cl. .................. 409/234; 279/103; 407/33; 408/238
[58] Field of Search .................. 409/125, 237; 279/102, 279/103; 407/66, 33; 408/226, 238, 239 R

[56] References Cited

U.S. PATENT DOCUMENTS

| | | | |
|---|---|---|---|
| 624,274 | 5/1899 | Walter | 279/103 |
| 926,845 | 7/1909 | Bradley | 279/103 |
| 1,018,096 | 2/1912 | Clark | 279/103 |
| 1,935,555 | 11/1933 | Gorton | 407/53 |
| 2,087,814 | 7/1937 | Rawlings | 279/103 |
| 2,287,457 | 6/1942 | Stowell et al. | 279/102 |
| 4,293,253 | 10/1981 | Ott | 408/226 |
| 4,448,120 | 5/1984 | Richardson et al. | 409/125 X |

FOREIGN PATENT DOCUMENTS

| | | |
|---|---|---|
| 0290810 | 11/1988 | European Pat. Off. . |
| 379428 | 11/1907 | France . |
| 907980 | 3/1946 | France . |
| 1574722 | 7/1969 | France . |
| 120853 | of 1901 | Germany . |
| 203504 | of 1939 | Switzerland . |
| 410963 | 5/1934 | United Kingdom . |

*Primary Examiner*—William Briggs
*Attorney, Agent, or Firm*—Burns, Doane, Swecker & Mathis

[57] ABSTRACT

The invention concerns a new type of tool for engraving machines comprising an oblong body (11a) provided at one end of an insert-receiving (19) pocket (18).

Said insert includes a cutting tip end (19a) at one end, one rear surface (23), as well as an intermediate surface in the shape of a cylindrical body (22) truncated by an oblique flat piece (24), the section of said cylindrical body (22) tapering away from said tip end (19).

Said oblong body (11a) is provided with a pocket (18) including a cylidrical wall corresponding to that of the cylindrical body (22), as well as a wall slanted in such a way as to be adapted to the obliquity of the flat piece (24), the surface of said wall (25) exhibiting a convexity in a radial and/or longitudinal direction so that said insert (19) can be inserted and maintained in said oblong body (11a) by jamming the flat piece (24) in the pocket (18).

6 Claims, 2 Drawing Sheets

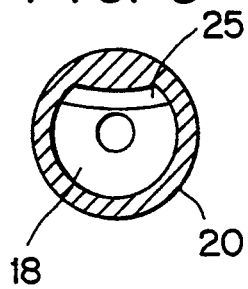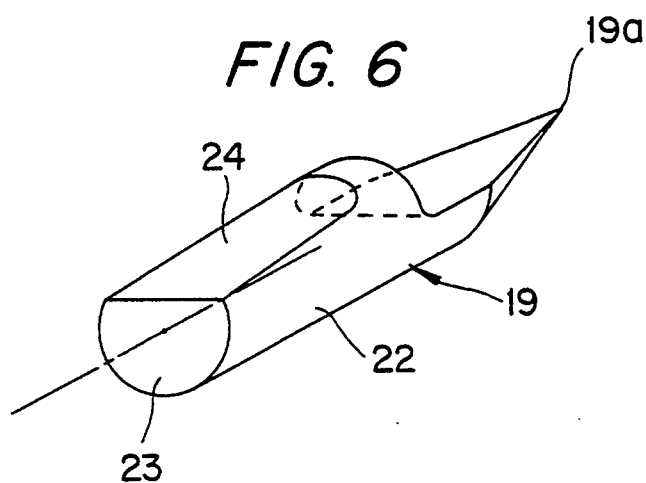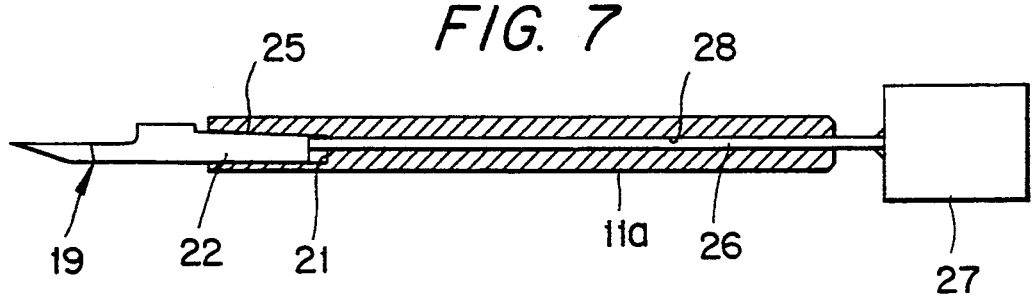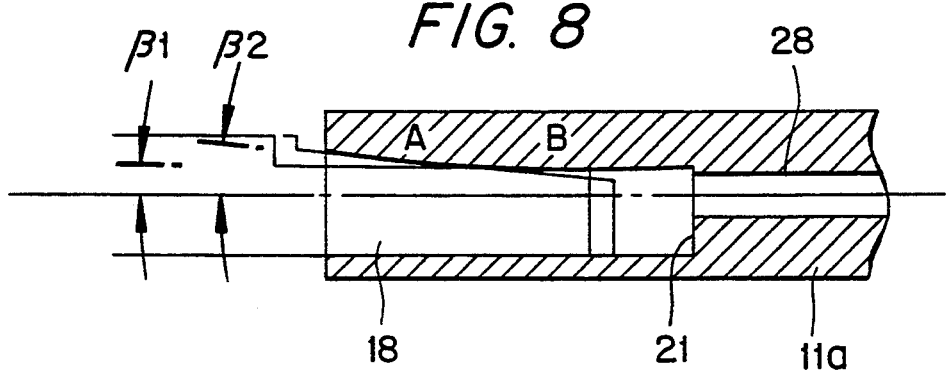

TOOL FOR ENGRAVING MACHINES

BACKGROUND OF THE INVENTION

The invention concerns a tool for engraving machines including a metallic body forming a support and provided at least at one of its ends with an insert.

These tools are normally used for machining shapes and patterns on brass, steel or copper plates, on plates made of plastic materials or on marble. One of their most common uses is to engrave letters, but they may also be used to engrave metals and crystal, as well as for engraving metallic moulds and for the machining of profiles.

These engraving tools generally comprise a support steel body on which an insert made of a hard metal is mounted and fixed by brazing. The drawback of this type of embodiment resides in the fact that the body of the steel tool is sensitive to corrosion, oxidation and the mechanical marks due to handling.

In addition, should the tool wear, it is necessary to either change the entire tool or to rectify the insert, either action proving to be a costly operation.

So as to mitigate these difficulties, the aim of the invention is to provide a tool for engraving machines able to dispense with the regrinding operation and easily and reliably mount the insert on the support.

SUMMARY AND OBJECTS

Accordingly, the present invention mainly concerns a tool for engraving machines including an oblong metallic support body and provided with an insert made of a material resisting wear at least at one of its ends, wherein:

said insert includes a tip end at one end, a rear surface, as well as an intermediate surface with the shape of a cylindrical body truncated by an oblique flat piece, the section of said cylindrical body tapering away from said tip end, and said oblong body is provided with a pocket including a cylindrical wall corresponding to that of the cylindrical body, as well as a wall slanted in such a way as to be adapted to the obliqueness of the flat piece, the surface of said wall exhibiting a convexity in a radial and/or longitudinal direction so that said mounted insert may be inserted and maintained inside said oblong body by jamming the flat piece in the pocket.

BRIEF DESCRIPTION OF THE DRAWINGS

Other characteristics and advantages of the invention shall appear more readily from a reading of the following description of a particular embodiment of the invention with reference to the accompanying drawings on which:

FIG. 5 shows a transverse section of the pocket of FIG. 4, FIG. 6 shows a perspective view of an insert forming part of the tool of FIG. 3, FIG. 7 shows a longitudinal section of the tool and the body with the disassembling tool able to be used according to the present invention, FIG. 8 shows a longitudinal section of the insert inserted in the pocket of the support body.

DETAILED DESCRIPTION OF THE PREFERRED EMBODIMENT

Figure 1:
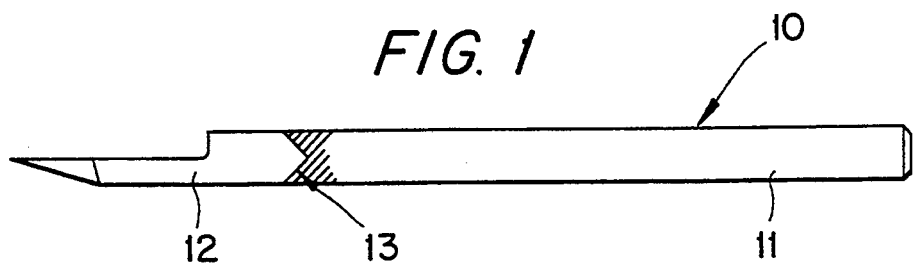
FIG. 1 shows a conventional tool for engraving machines and provided with a head or brazed insert.
Figure 2:
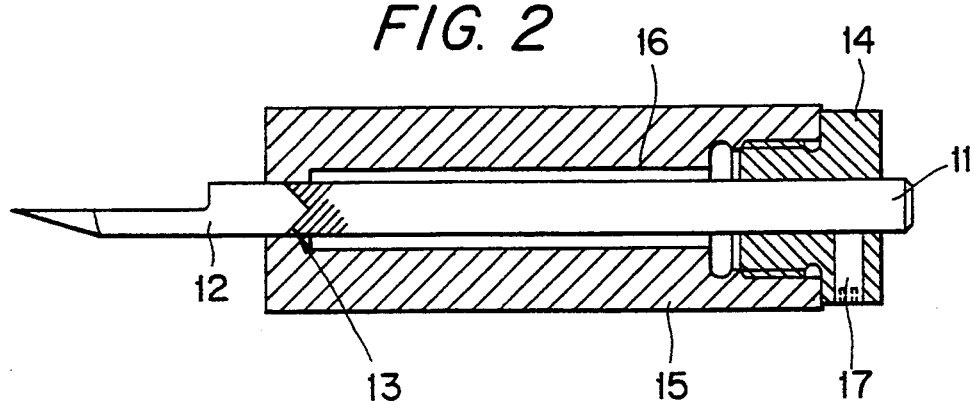
FIG. 2 shows a tool according to FIG. 1 and fixed to a support body placed in the support body of the engraving machine.

An engraving tool 10, as shown on FIG. 1, includes a support steel body 11 to which a carbide insert 12 is secured and fixed in position by soldering along a brazed joint 13. The steel body 11 appears in the shape of a cylindrical bar. As shown on FIG. 2, a threaded element or joining piece 14 is screwed into the rear end of the support body 15. The steel body 11 extends axially through a central hole 16 traversing said support body 15 and communicating with a corresponding hole also provided in the threaded joining piece 14. A radial fixing screw 17 is provided for adjusting and locking in an axial position said steel body 11 in said support body 15 so that the insert 12 situated at the front extends forwards beyond the end of said body over an appropriate distance.

Figure 3:
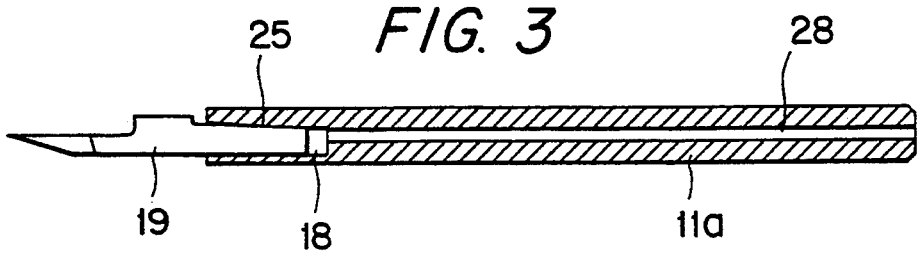
FIG. 3 shows a longitudinal section of a tool for engraving machines according to the invention.

As shown on FIG. 3, the tool of the invention includes an elongated support cylindrical body 11a and provided with a pocket 18 able to house a movable insert 19.

As shown on FIG. 6, the insert includes a tip end 19a situated at one of its ends. This edge is extended by an intermediate portion with the shape of a cylindrical body 22 truncated over one portion of its length by a flat piece 24 so that the section of the body 22 tapers away from the tip end. The end of the cylindrical body opposite the tip end constitutes a rear surface 23 with the shape of a truncated circle.

Figure 4:
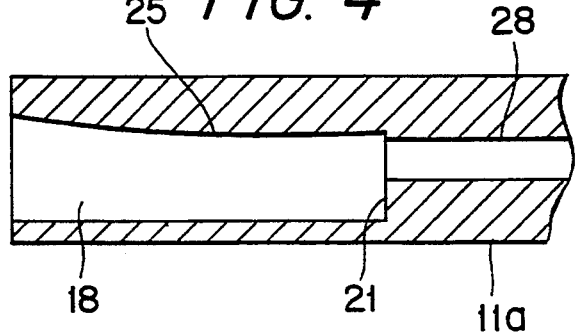
FIG. 4 shows an enlarged partial longitudinal section of the oblong support body and forming part of the tool of FIG. 3.

With reference to FIGS. 3, 4 and 5, the oblong body 11a has a general cylindrical shape and is provided with a traversing central cylindrical bore 28. This bore is in relation via one of its sides with a pocket 18 whose bottom wall 21 is disposed transversally. The pocket 18 has a shape corresponding to the cylindrical wall of the body 22 of the insert 19 and also has a wall 25 slanted in such a way as to be adapted to the obliqueness of the flat piece 24 of the insert. This slanted wall 25 exhibits a convexity in both a radial direction and a longitudinal direction.

As shown on FIG. 8, the insert 19 is thus able to be inserted and maintained inside the pocket of the body by means of the flat piece 24 engaged on the corresponding slanted wall 25.

In addition, the double convexity of the slanted wall of the pocket allows inserts to be used having certain shape and angular defects.

Thus, it is possible to insert the insert 19 coming into contact with the wall, either at the level of the point A or at B.

The angular tolerance of usable inserts is thus equal to $\beta_2 - \beta_1$. It is to be noted that this tolerance is relative to the longitudinal convexity of the wall. It is clear that it also exists due to the radial convexity of the wall and that the tool of the present invention is able to be freed of the angular defects of the inserts in both the radial and longitudinal directions.

The tool described above is able to dispense with the brazing operation. In addition, should the cutting tool become worn, it merely suffices to change the insert 19 and no longer as in the prior art by rectifying it, since the link between the insert and the support 11a is movable.

The particular profile of the two elements of the tool enable the insert 19 to set and automatically lock when used against the walls of the pocket 18 of the support 11a. Thus, the insert is able to remain in the required position, even under the influence of large forces of heavy vibrations.

The use at the level of the support 11a and the insert 19 with complementary cylindrical shapes facilitates their machining and thus financial savings may be made with regard to other embodiments, such as a conical pocket, which would not guarantee improved locking.

Due to the convexity of the wall 25 of the pocket 18, it is therefore possible to associate with the support 11a inserts whose flat piece 24 exhibits shape or angular defects without nevertheless causing damage when placing these elements.

The presence of this convex wall 25 is further able to be freed of the sharp angles constituted by the connection of the flat piece 24 and the cylindrical portion 22 of the point and thus avoid the breaking of these angles which would be necessary in the case of a completely additional insert and pocket.

The locking of the insert 19 is provoked by jamming its flat piece 24 into the convex wall 25 of the pocket 18, this jamming also generating a reclamping phenomenon of the cylindrical wall 22 of the pocket 18 around the cylindrical body of the insert.

So as to disassemble the tool in order to be able to replace the insert 19, as shown on FIG. 7, a cylindrical body 26 is introduced into the central bore 28 of the body 11a by applying a weight 27 at the rear so as to ensure the axial displacement of said rod until it comes into direct contact with the rear end of said insert 19 so as to push it forwards for freeing said body 11a.

The body 11a should preferably be manufactured from a hard material and resistant to corrosion and oxidation (cemented carbide, stainless steel, etc.).

The insert 19 should preferably be manufactured from the same material as that of said body. However, it is possible to use these inserts 19 made of different materials, such as high speed steel, coated cemented carbide material or a polycrystalline diamond head.

The invention is not merely restricted to the examples shown and described above, but various modifications may be made without departing from the context of the invention. Thus, according to another embodiment, the body may be provided with a pocket at each end.

We claim:

1. Tool for engraving machines including an oblong metallic support body and provided with an insert made of a material able to resist wear at least at one of its ends, wherein said insert includes a tip end at one end, one rear surface, as well as an intermediate surface having the shape of a cylindrical body truncated by an oblique flat piece, the section of said cylindrical body tapering away from said tip end (19), said oblong body is provided with a pocket including a cylindrical wall corresponding to that of the cylindrical body, as well as a wall slanted in such a way as to be adapted to the obliquity of the flat piece, the surface of said wall exhibiting a convexity in a radial direction and/or in a longitudinal direction so that said insert may be inserted and maintained in said oblong body by jamming the flat piece into the pocket.

2. A tool for engraving machines comprising:
   an insert having a working end, a rear surface and an intermediate surface, said intermediate surface having a cylindrical shape truncated by an oblique substantially planar surface; and
   an oblong support body having a pocket, said pocket including a cylindrical wall corresponding to said intermediate surface of said insert, and a slanted wall truncating said cylindrical wall and having a convex surface so that said insert may be inserted and maintained in said oblong body by engagement of the planar surface of the insert with the convex surface of the support body pocket.

3. The tool for engraving machines as claimed in claim 2, wherein said convex surface is convex in a longitudinal direction.

4. The tool for engraving machines as claimed in claim 2, wherein said convex surface is convex in a radial direction.

5. The tool for engraving machines as claimed in claim 2, wherein said oblong metallic support body is provided with a longitudinal cylindrical bore extending from a distal end of said support body to said pocket.

6. The tool for engraving machines as claimed in claim 5, further comprising a disassembly tool having a cylindrical body adapted to be inserted into the longitudinal cylindrical bore of the support body, and said disassembly tool having a weight connected to the cylindrical body.

* * * * *